(12) United States Patent
Guillemaut et al.

(10) Patent No.: US 8,672,268 B2
(45) Date of Patent: Mar. 18, 2014

(54) OBLIQUE PANEL AT THE REAR OF A CENTRAL BOX OF AN AIRCRAFT FUSELAGE

(75) Inventors: Julien Guillemaut, Toulouse (FR); Aurelie Piat, Toulouse (FR); Jerome Comagro, Toulouse (FR); Frederic Fort, Saint Genies Bellevue (FR); Dominique Guittard, Toulouse (FR); Jean Marc Durand, Levignac sur Save (FR)

(73) Assignee: Airbus Operations S.A.S., Toulouse (FR)

( * ) Notice: Subject to any disclaimer, the term of this patent is extended or adjusted under 35 U.S.C. 154(b) by 163 days.

(21) Appl. No.: 13/307,394

(22) Filed: Nov. 30, 2011

(65) Prior Publication Data

US 2012/0138746 A1    Jun. 7, 2012

(30) Foreign Application Priority Data

Dec. 1, 2010    (FR) .................................. 10 59960

(51) Int. Cl.
*B64C 1/06*    (2006.01)
*B64C 3/18*    (2006.01)

(52) U.S. Cl.
USPC ..................................... 244/119; 244/123.7

(58) Field of Classification Search
USPC .......... 244/123.1, 119, 120, 123.4, 123.7, 124
See application file for complete search history.

(56) References Cited

U.S. PATENT DOCUMENTS

| | | | | |
|---|---|---|---|---|
| 1,418,008 A | * | 5/1922 | Martin | 244/102 R |
| 1,431,520 A | * | 10/1922 | Hall | 244/123.8 |
| 1,645,964 A | * | 10/1927 | Mummert | 244/119 |
| 1,966,933 A | * | 7/1934 | Ragsdale | 114/79 R |
| 2,818,226 A | * | 12/1957 | Hiller, Jr. et al. | 244/120 |
| 2,827,251 A | * | 3/1958 | Doman | 244/119 |
| 4,448,372 A | * | 5/1984 | Larson | 244/87 |
| 6,126,113 A | * | 10/2000 | Navickas | 244/120 |
| 2008/0272236 A1 | * | 11/2008 | Rawdon et al. | 244/118.1 |
| 2010/0170995 A1 | | 7/2010 | Maenz | |
| 2013/0146709 A1 | * | 6/2013 | Bernadet et al. | 244/118.5 |

FOREIGN PATENT DOCUMENTS

| | | |
|---|---|---|
| WO | 94/15041 | 7/1994 |
| WO | 2007/144377 | 12/2007 |
| WO | 2008/105805 | 9/2008 |

OTHER PUBLICATIONS

French Search Report dated Jun. 16, 2011, corresponding to Foreign Priority Application No. FR 1059960.

* cited by examiner

*Primary Examiner* — Tien Dinh
(74) *Attorney, Agent, or Firm* — Young & Thompson

(57) ABSTRACT

An aircraft structure includes a wing spar (10), with orbital frames (24, 24', 24") arranged in transverse planes, right and left horizontal spars (26) connected to the wing spar (10) at the upper panel (14) of the spar respectively to the right and to the left of the spar, and for each right or left horizontal spar (26), a triangular panel (50) that includes a wall (60), a first edge arranged at the horizontal spar (26), a second side arranged at the wing spar (10), and a third side at which a first rectilinear oblique reinforcement (62) connecting the horizontal spar (26) and the wing spar (10) is provided, characterized in that the triangular panel (50) includes at least one second rectilinear oblique reinforcement (64) that connects the horizontal spar (26) and the wing spar (10).

12 Claims, 3 Drawing Sheets

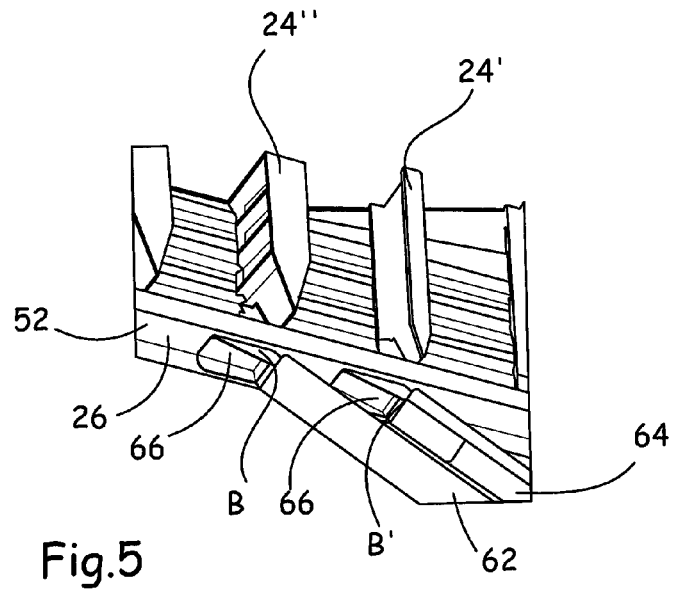
Fig.5
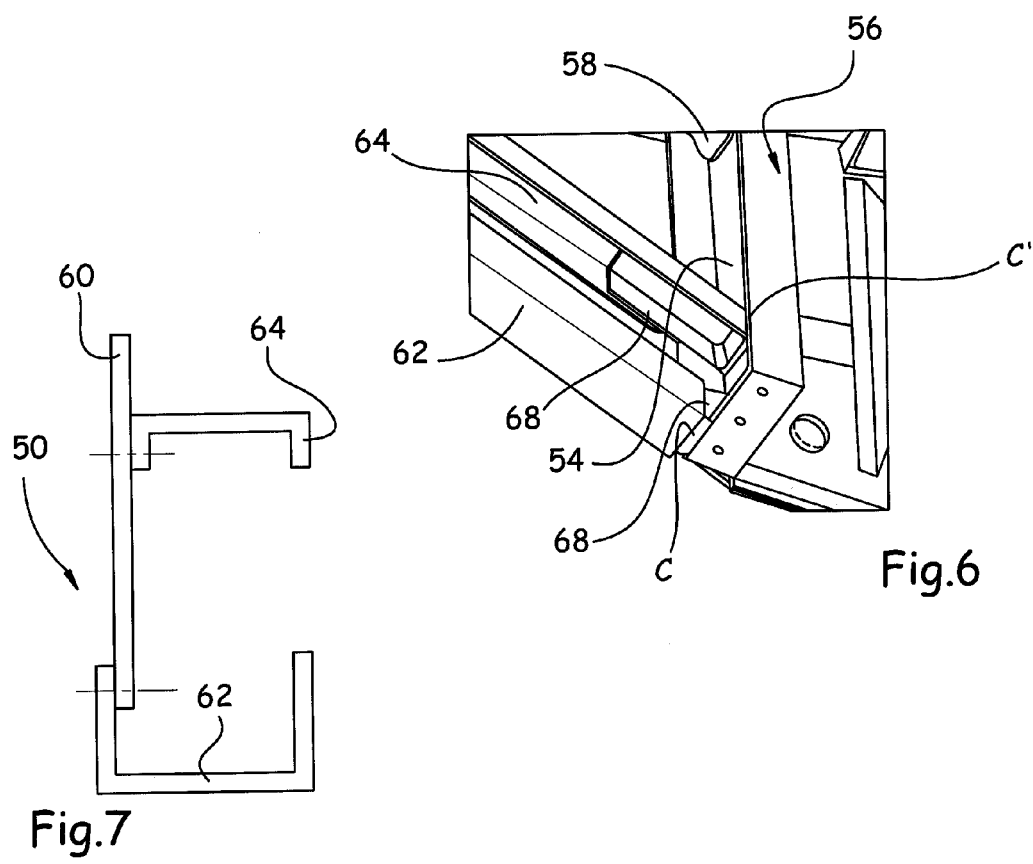
Fig.7
Fig.6

OBLIQUE PANEL AT THE REAR OF A CENTRAL BOX OF AN AIRCRAFT FUSELAGE

This invention relates to a triangular panel that is arranged at the rear of a central spar of an aircraft fuselage.

Figure 1:
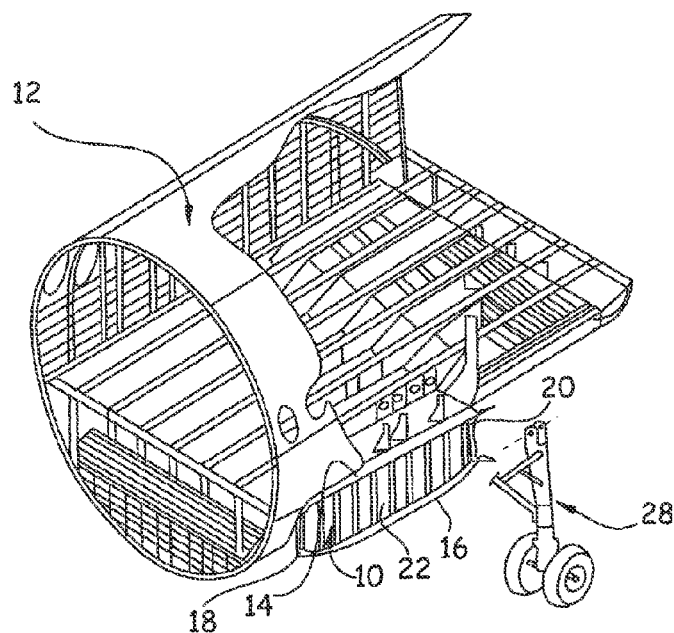

As illustrated in FIG. 1, the structure of an aircraft comprises two subassemblies, on the one hand a fuselage and on the other hand a wing that are connected by means of a boxed structure 10 called a wing spar. This central spar 10 is integrated in a subassembly called a central section 12 that also comprises a part of the fuselage of the aircraft.

This wing spar 10 comprises an upper panel 14, a lower panel 16, a front panel that is also called a front spar 18, and a rear panel that is also called a rear spar 20. The opening that is delimited by the edges of panels and spars oriented toward the right wing is closed by a right panel 22, and the opening that is delimited by the edges of panels and spars oriented toward the left wing is closed by a left panel.

According to one embodiment, an aircraft fuselage comprises a structure that consists of stiffeners to which is connected a wall that forms the shell of the aircraft. To ensure the absorption of stresses, the structure comprises orbital frames 24, 24', 24" arranged in transverse planes and spars arranged in the longitudinal direction. The fuselage comprises in particular a straight spar 26 that is arranged in the extension of the intersection of the edges located to the right of the upper panel 14 and the rear spar 20 and a left spar arranged in the extension of the intersection of the edges located to the left of the upper panel 14 and the rear spar 20.

According to one embodiment, a central section 12 comprises housings that are called wheel wells that make it possible to house landing gear 28. To allow the movements of the landing gear 28, the central section 12 comprises cut-outs (one for each gear on both sides of the fuselage). To ensure the stability of the free edges of these cut-outs and the absorption of stresses between the left and right spars and the central spar 10, a triangular or trapezoidal panel 30 as described in the document WO2008/105805, for example, is provided on each side of the central section.

Figure 2:
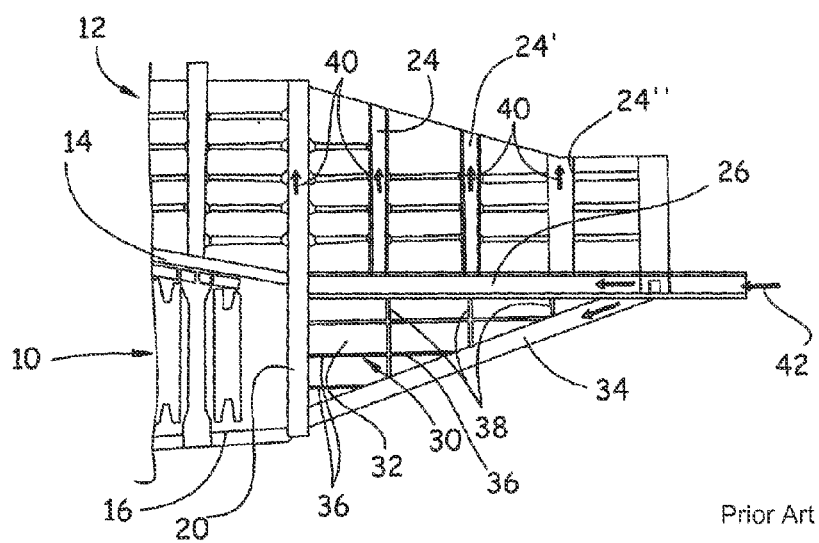

As illustrated in FIG. 2, this triangular panel 30 comprises a triangular wall 32 with reinforcements, with a first side being connected to the horizontal spar 26 (right or left), a second side being connected to the rear spar 20, and a third side comprising an oblique reinforcement 34. In addition, to ensure the absorption of stresses, the triangular frame 30 comprises additional horizontal reinforcements 36 and vertical reinforcements 38.

As indicated in FIG. 2, each frame of the fuselage exerts a stress of traction/vertical compression 40 on the triangular panel 30 facing the additional vertical reinforcements 38. The straight spar 26 absorbs a traction/compression stress 42 in the direction of the spar that is distributed into the triangular panel 30 and more particularly into the oblique reinforcement 34 and the complementary horizontal reinforcements 36.

This triangular panel comprises numerous reinforcements whose installation is relatively long, and leads to increasing the costs of assembly and on-board weight.

Also, the purpose of this invention is to remedy the drawbacks of the prior art by proposing a new structure for a triangular panel that ensures the absorption of stresses between a spar and a wing spar of an aircraft fuselage.

For this purpose, the invention has as its object an aircraft structure that comprises a wing spar, with orbital frames arranged in transverse planes, right and left horizontal spars connected to the wing spar at the upper panel of said spar respectively to the right and to the left of said spar, and for each right or left horizontal spar, a triangular panel that comprises a wall, a first edge arranged at the horizontal spar, a second side arranged at the wing spar, and a third side at which a first rectilinear oblique reinforcement connecting the horizontal spar and the wing spar is provided, characterized in that the triangular panel comprises at least one second rectilinear oblique reinforcement that connects the horizontal spar and the wing spar.

Figure 3:
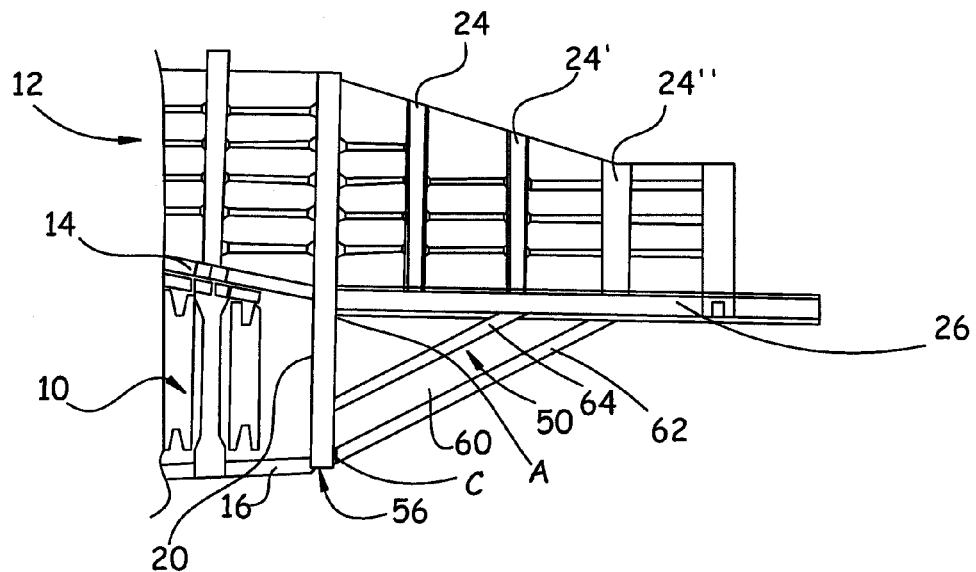
Figure 4:
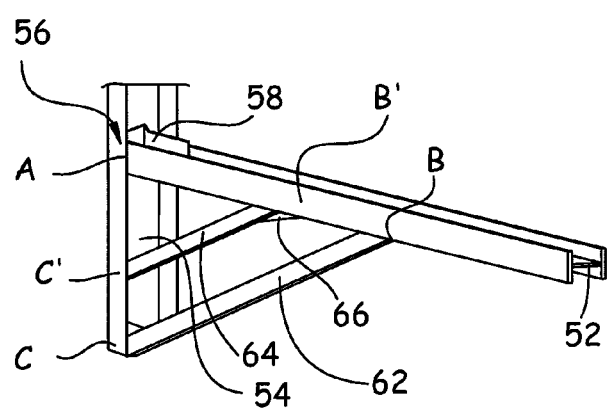

Other characteristics and advantages will emerge from the following description of the invention, a description that is provided only by way of example, relative to the accompanying drawings in which:

FIG. 1 is a perspective view of the central section of an aircraft,

FIG. 2 is a side view of a panel that is arranged behind a wing spar according to the prior art, FIG. 3 is a side view of a panel that is arranged behind a wing spar according to the invention, FIG. 4 is a perspective view that diagrammatically illustrates the reinforcements of the panel according to the invention, FIG. 5 is a perspective view that illustrates in detail the junctions between the reinforcements of the panel according to the invention and a horizontal spar, FIG. 6 is a perspective view that illustrates in detail the junctions between the reinforcements of the panel according to the invention and a rear spar of a wing spar, and FIG. 7 is a cutaway that illustrates a detail of the panel according to the invention.

FIG. 3 shows a part of a wing spar 10, a triangular panel 50 according to the invention located at the rear of the spar 10, and a horizontal spar 26 (right or left). The elements that surround the triangular panel that are common with the prior art are referenced in the same manner.

According to one embodiment, the horizontal spar 26 has an I-shaped cross-section, with the core 52 being arranged in a horizontal plane. According to the variants, the horizontal spar 26 can be metal or made of composite material.

The rear spar 20 of the wing spar comprises a rear surface 54 that is essentially vertical, oriented toward the rear of the aircraft. According to one embodiment, the rear spar 20 comprises—facing the horizontal spar—a frame 56 (also called a bulkhead) with an I-shaped cross-section whose one core face corresponds to the rear surface 54. This bulkhead 56 can be metal or made of composite material.

The horizontal spar 26 is connected to the bulkhead 56 by any suitable means. According to one embodiment, the height of the horizontal spar 26 (distance separating the base from the top) is less than that of the bulkhead 56. The end of the horizontal spar 26 rests against the surface 54 of the bulkhead 56. At least one bracket 58 ensures the connection between the horizontal spar 26 and the bulkhead 56. According to one embodiment that is illustrated in FIGS. 4 and 6, two brackets 58, one above and one below the spar 26, ensure the connection between the horizontal spar 26 and the bulkhead 56.

The horizontal spar 26, the rear spar of the central spar, and the connecting means between these two elements are not presented in more detail because they can take on different configurations based on, in particular, materials that are used.

The triangular panel 50 comprises, on the one hand, a reinforcement structure, and, on the other hand, a wall 60. The wall 60 can be made of different materials, in particular composite material. This wall that also ensures the function of connection between the different elements of the reinforcement structure is not presented in more detail.

According to the invention, the reinforcement structure comprises at least two rectilinear oblique reinforcements 62, 64 whose ends are connected, on the one hand, to the horizontal spar 26, and, on the other hand, to the wing spar 10.

The oblique reinforcements 62, 64 are parallel.

They extend from the horizontal spar up to the central spar.

Preferably, the reinforcement structure comprises only two oblique rectilinear reinforcements 62, 64.

A first edge of the triangular panel 50 is arranged at the horizontal spar 26; a second edge of the triangular panel 50 is arranged at the rear spar of the wing spar 10. The tip A of the triangular panel corresponds to the intersection of the first and second edges. The third edge of the triangular panel corresponds to the cut-out provided at the fuselage for the passage of the landing gear 28. A first oblique reinforcement 62 is arranged at the third edge; it ensures the connection between a point B of the triangular panel that is the farthest from the wing spar and a point C of the triangular panel that is located facing the lower panel of the wing spar.

The second oblique reinforcement 64 extends between a point B' (located at the horizontal spar 26) and a point C' (located at the wing spar 10), whereby the distance BB' is approximately equal to ⅓ of the distance BA.

Advantageously, the junction points between the oblique reinforcements 62, 64 and the horizontal spar 26 are arranged facing the orbital frames 24', 24".

To ensure the absorption of stresses, the oblique reinforcements 62, 64 have more significant moments of inertia in the direction that is perpendicular to the wall 60.

According to one embodiment, the oblique reinforcements 62, 64 have a U-shaped cross-section with a base that is oriented perpendicular to the wall 60, and two branches of which one is coupled against the wall 60.

Advantageously, the U-shaped cross-sections of the oblique reinforcements 62 and 64 are oriented in a reverse direction, with the ends of the reinforcement branches 62 being oriented toward the ends of the branches of the reinforcement 64. As illustrated in detail in FIG. 7, the reinforcement 64 is oriented downward to prevent it from being filled with waste and dust. The reinforcement 62 is oriented upward to protect the edge of the wall 60, with the latter being attached at the inside face of one of the reinforcement branches 62.

The ends of the oblique reinforcements 62 and 64 are connected to the horizontal spar 26 by any suitable means.

According to one embodiment that is illustrated in FIG. 5, the oblique reinforcements 62 and 64 are each connected to the horizontal spar 26 by means of a separating piece 66.

This separating piece 66 comprises a part that is coupled and attached against the oblique reinforcement 62 or 64 and another part that is coupled and attached against the horizontal spar 26.

In the case of pieces made of composite material, this separating piece 66 has a U-shaped cross-section whose base is flattened against the base of the U of the oblique reinforcement 62 or 64 and against the core 52 of the horizontal spar 26 and whose wings are flattened against the wings of the U of the oblique reinforcement 62 or 64 or against the wings of the horizontal spar 26.

According to one embodiment that is illustrated in FIG. 6, the oblique reinforcements 62 and 64 are each connected to the wing spar 10 by means of a separating piece 68.

This separating piece 68 comprises a part that is coupled and attached against the oblique reinforcement 62 or 64 and another part that is coupled and attached against the bulkhead 56 of the wing spar.

In the case of pieces made of composite material, this separating piece 68 has a U-shaped cross-section whose base is flattened against the base of the U of the oblique reinforcement 62 or 64 and against the core of the bulkhead 56 and whose wings are flattened against the wings of the U of the oblique reinforcement 62 or 64 or against the wings of the bulkhead 56.

The invention claimed is:

1. Aircraft structure that comprises a wing spar (10), with orbital frames (24, 24', 24") arranged in transverse planes, right and left horizontal spars (26) connected to the wing spar (10) at the upper panel (14) of said spar respectively to the right and to the left of said spar, and for each right or left horizontal spar (26), a triangular panel (50) that comprises a wall (60), a first edge arranged at the horizontal spar (26), a second side arranged at the wing spar (10), and a third side at which a first rectilinear oblique reinforcement (62) connecting the horizontal spar (26) and the wing spar (10) is provided,
wherein the triangular panel (50) comprises at least one second rectilinear oblique reinforcement (64) that connects the horizontal spar (26) and the wing spar (10), and
wherein junction points between the first and second rectilinear oblique reinforcement (62, 64) and the respective said horizontal spars (26) are arranged facing the orbital frames (24', 24").

2. Aircraft structure according to claim 1, wherein the oblique reinforcements are parallel.

3. Aircraft structure according to claim 2, wherein the triangular panel (50) comprises only two oblique reinforcements (62, 64).

4. Aircraft structure according to claim 2, wherein a distance BB' is approximately equal to ⅓ of a distance BA, with A corresponding to the point of intersection of the wing spar (10) and the horizontal spar (26), with B being the junction zone of the first oblique reinforcement (62) and the horizontal spar (26), and with B' being the junction zone of the second oblique reinforcement (64) and the horizontal spar (26).

5. Aircraft structure according to claim 1, wherein the triangular panel (50) comprises only two oblique reinforcements (62, 64).

6. Aircraft structure according to claim 5, wherein a distance BB' is approximately equal to ⅓ of a distance BA, with A corresponding to the point of intersection of the wing spar (10) and the horizontal spar (26), with B being the junction zone of the first oblique reinforcement (62) and the horizontal spar (26), and with B' being the junction zone of the second oblique reinforcement (64) and the horizontal spar (26).

7. Aircraft structure according to claim 1, wherein a distance BB' is approximately equal to ⅓ of a distance BA, with A corresponding to the point of intersection of the wing spar (10) and the horizontal spar (26), with B being the junction zone of the first oblique reinforcement (62) and the horizontal spar (26), and with B' being the junction zone of the second oblique reinforcement (64) and the horizontal spar (26).

8. Aircraft structure according to claim 1, wherein the oblique reinforcements (62, 64) have a U-shaped cross-section with a base and two branches, said base being oriented perpendicular to the wall (60), one of said two branches being coupled against the wall (60).

9. Aircraft structure according to claim 1, wherein the oblique reinforcements (62, 64) are each connected to the horizontal spar (26) by means of a separating piece (66).

10. Aircraft structure according to claim 1, wherein the oblique reinforcements (62, 64) are each connected to the wing spar (10) by means of a separating piece (68).

11. Aircraft structure according to claim 1, wherein a junction zone (C') of the second rectilinear oblique reinforcement (64) with the wing spar (10) is spaced from a junction zone (C) of the first rectilinear oblique reinforcement (62) with the wing spar (10).

12. Aircraft structure that comprises a wing spar (10), with orbital frames (24, 24', 24") arranged in transverse planes, right and left horizontal spars (26) connected to the wing spar (10) at the upper panel (14) of said spar respectively to the right and to the left of said spar, and for each right or left horizontal spar (26), a triangular panel (50) that comprises a wall (60), a first edge arranged at the horizontal spar (26), a second side arranged at the wing spar (10), and a third side at which a first rectilinear oblique reinforcement (62) connecting the horizontal spar (26) and the wing spar (10) is provided,
- wherein the triangular panel (50) comprises at least one second rectilinear oblique reinforcement (64) that connects the horizontal spar (26) and the wing spar (10),
- wherein the oblique reinforcements (62, 64) have a U-shaped cross-section with a base that is oriented perpendicular to the wall (60), and two branches, one of which is coupled against the wall (60), and
- wherein the U-shaped cross-sections of the oblique reinforcements (62, 64) are oriented in the reverse direction, with the ends of the reinforcement branches (62) being oriented toward the ends of the reinforcement branches (64).

\* \* \* \* \*